Oct. 22, 1963          R. P. BONEWITS          3,107,522
                    SELF-CENTERING WORK HOLDER
                       Filed Feb. 8, 1960
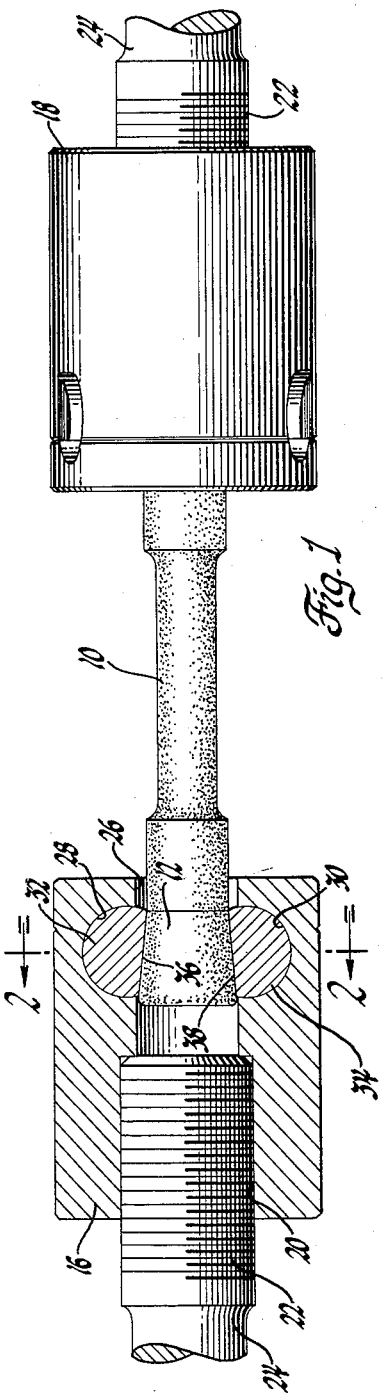
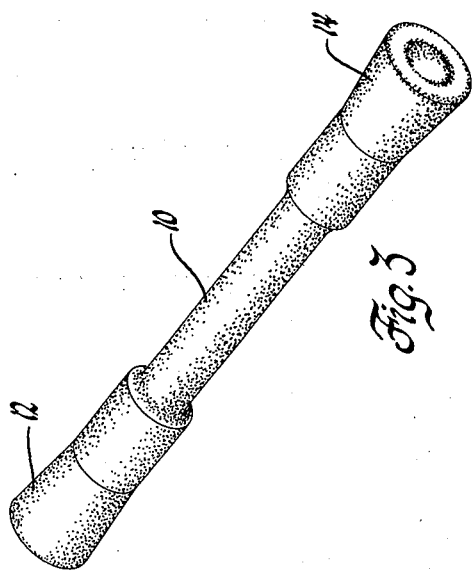
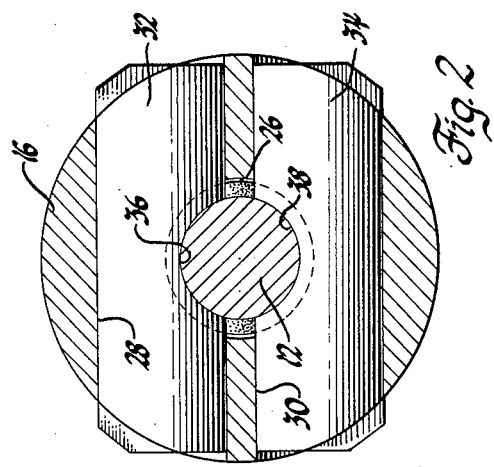
INVENTOR.
Robert P. Bonewits
BY
C. P. Barnard
ATTORNEY 3,107,522
SELF-CENTERING WORK HOLDER
Robert P. Bonewits, Greenwood, Ind., assignor to General Motors Corporation, Detroit, Mich., a corporation of Delaware
Filed Feb. 8, 1960, Ser. No. 7,251
3 Claims. (Cl. 73—103)

This invention relates to a self-centering work holder and more particularly to a specimen holder for a tension testing machine.

The object of this invention is to provide a work holder having self-centering gripping means of simple construction and arrangement and being unusually strong, durable and efficient in use. It is a further object of this invention to provide tension test gripping means which are readily changeable to accommodate various types of tension test specimens. Another object of this invention is to provide a tension test specimen holder having optimum alignment qualities whereby true axial loading may be insured.

With the foregoing and other objects in view, the invention consists of the novel construction, combination and arrangement of the parts as hereinafter more specifically described and illustrated in the accompanying drawings wherein:

FIGURE 1 is a side elevational view, partly in section, of the preferred embodiment of my invention;

FIGURE 2 is a cross-sectional view taken along the line 2—2 in FIGURE 1; and

FIGURE 3 is a perspective view of a tension test specimen adapted for use with my device.

Referring now to FIGURE 1, a tension test specimen 10 having frusto-conical end portions 12, 14 is secured between a pair of support cylinders or housings 16, 18. Since the cylinders are identical, only the cylinder 16 will be described in detail. Cylinder 16 is provided at one end with a threaded, axially extending bore 20 that accommodates a threaded coupling portion 22 of a pull rod 24 of a conventional tension test machine and the other end of the cylinder contains a bore 26 coaxially aligned and communicating with the threaded bore 20. Inwardly spaced from the open end of the cylinder 16 are a pair of oppositely spaced transverse through bores 28, 30 defining pin seats that extend from the outer periphery of the cylinder 16 and partially intersect the bore 26. Locating and gripping rods or pins 32, 34 provide cylindrical work holding jaws and have a diameter approximately equal to the diameter of the through bores 28, 30 in which they are rotatably mounted. Opposite portions of the periphery of each of the rods 32, 34 that intersect the bore 26 are recessed and contoured to provide sloping surfaces 36, 38 defining curved seats on each pin that are cooperable to restrain axial movement of the test specimen 10. In the preferred embodiment, the sloping surfaces are approximately semicircular tapered grooves that extend transversely to the longitudinal axes of the rods 32, 34 and provide a partial frusto-conical jaw envelope restrainingly engageable with the frusto-conical section 12 of the specimen 10. Other types of surfaces may be provided to accommodate differently shaped test specimens.

In operation, the tension test fixture 10 is first inserted within the central bores of the cylinder supports 16, 18, and positioned therein so that the reduced section of the specimen is aligned with the transverse rod holes. The diameter of the reduced section of the specimen is sufficiently small relative to the opening between the rods 32, 34 to permit passage thereof past the reduced section so that the ends of the specimen may then be seated on the rods. The drawing is merely illustrative and not a scaled representation, and the size of the rods 32, 34 has been enlarged on the drawing relative to the specimen for clarity. Then the locating rods 32, 34 are inserted through the holes in their respective support cylinders and properly aligned so that the surfaces 36, 38 engage the periphery of the frusto-conical end sections 12, 14. The pull bars 24 are then threaded into the ends of the support cylinders and the fixture is thereby mounted within the tension testing machine. As the specimen is axially loaded, the guide rods 32, 34 are freely rotatable within their seats 28, 30 so that the test specimen 10 will assume true axial alignment with the axial force being applied. The gripping rods may be readily exchanged if one of them should become damaged. In addition, several different configurations may be formed in different sets of gripping rods to accommodate tension test specimens having differently shaped end portions without interfering with the rotative aligning effect of the gripping rods in their curved seats 36, 38.

Although the preferred embodiment of my invention has been described in detail, changes, variations and modifications can be resorted to which come within the scope of the claims hereunto appended.

I claim:

1. A self-centering specimen holder for tensil testing machines having a pair of support housings adapted to grip therebetween a linear test specimen formed with contoured ends, each said support housing comprising an axially extending bore adapted to receive opposite ends of said test specimen, fastening means on opposite ends of each said housing for association with a testing machine, a seat formed interiorly of each said support housing and transversely intersecting said axial bore, and work gripping means slidably and rotatably supported in each said seat and having a contoured portion outwardly facing from said seat and matching the contours of said test specimen ends, each said contoured portion positionable in said axial bore for gripping engagement with the contoured end of said test specimen, each said work gripping means being rotated in said seat as said test specimen ends engage the matching contoured portions of said work gripping means whereby said test specimen ends are prevented from being withdrawn from said bore without interfering with the axial alignment thereof.

2. A self-centering specimen holder for a tensil testing machine comprising a pair of support housings adapted to grip therebetween a linear test specimen formed with contoured ends, fastening means on opposite ends of each said housing for association with the testing machine, an axially extending bore formed in each said housing and adapted to receive opposite ends of said specimen, a pair of seats formed interiorly of each said housing and each seat in each said pair transversely intersecting said axial bore on opposite sides of said bore axis, a pair of work gripping means received in each said seat being slidably and rotatably supported therein, and contoured portions matching the contours of said test specimen ends formed on each said work gripping means and being positionable in said axial bore, said contoured portions outwardly facing from said seats and being engageable with the matching contoured ends of said test specimen, said work gripping means being rotated in said seats as said test specimen ends engage the matching contoured portions of said work gripping means whereby said test specimen ends are prevented from being withdrawn from said bores without interfering with the axial alignment thereof.

3. The device as described in claim 2 wherein said contoured portions match a frusto-conical formation of said test specimen ends.

(References on following page)

References Cited in the file of this patent

UNITED STATES PATENTS

| | | |
|---|---|---|
| 1,408,993 | Eberhardt | Mar. 7, 1922 |
| 1,496,803 | Amsler | June 10, 1924 |
| 1,885,855 | Moran | Nov. 1, 1932 |
| 1,943,931 | Ruch | Jan. 16, 1934 |
| 2,168,499 | Spicacci | Aug. 8, 1939 |
| 2,454,850 | Van Winkle et al. | Nov. 30, 1948 |
| 2,700,549 | Cornett | Jan. 25, 1955 |
| 2,731,273 | Edens | Jan. 17, 1956 |
| 2,885,232 | Eberly | May 5, 1959 |

FOREIGN PATENTS

| | | |
|---|---|---|
| 664,640 | Great Britain | Jan. 9, 1952 |